US007267865B2

(12) United States Patent
Hetzler et al.

(10) Patent No.: US 7,267,865 B2
(45) Date of Patent: Sep. 11, 2007

(54) DRAW RESONANT RESISTANT MULTILAYER FILMS

(75) Inventors: Kevin G. Hetzler, Sparta, NJ (US); Viktor Skatchkov, Bloomingdale, NJ (US); Xixian Zhou, Collegeville, PA (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 327 days.

(21) Appl. No.: 10/901,910

(22) Filed: Jul. 29, 2004

(65) Prior Publication Data

US 2005/0186433 A1 Aug. 25, 2005

Related U.S. Application Data

(63) Continuation-in-part of application No. 10/783,946, filed on Feb. 20, 2004, now abandoned.

(51) Int. Cl.
*B32B 27/08* (2006.01)
*B32B 27/30* (2006.01)

(52) U.S. Cl. ....................... 428/213; 428/421; 428/522

(58) Field of Classification Search ................ 428/213, 428/411.1, 421, 422, 522
See application file for complete search history.

(56) References Cited

U.S. PATENT DOCUMENTS 3,253,060 A 5/1966 Koblitz et al.
4,317,860 A 3/1982 Strassel
4,677,017 A 6/1987 DeAntonis et al.
4,743,327 A 5/1988 DeHaan et al.
4,859,379 A 8/1989 Chiang
4,871,506 A 10/1989 Moulies et al.
4,879,345 A 11/1989 Connelly et al.
5,143,761 A 9/1992 Chiotis et al.
5,242,976 A 9/1993 Strassel et al.
5,256,472 A 10/1993 Moriya et al.
5,284,710 A 2/1994 Hartley et al.
5,322,899 A 6/1994 Grunewalder et al.
5,395,471 A 3/1995 Obijeski et al.
5,589,028 A 12/1996 Robinson et al.
5,756,230 A 5/1998 Gao et al.
6,114,441 A 9/2000 Spohn et al.
6,117,508 A 9/2000 Parsonage et al.
6,127,478 A 10/2000 Spohn
6,136,437 A 10/2000 Reither
6,143,415 A 11/2000 Lorek et al.
6,284,335 B1 9/2001 Spohn
6,306,503 B1 10/2001 Tsai (Continued)

OTHER PUBLICATIONS

C. Pattamaprom, et al., “Analysis of Extensional Viscosity Techniques for the Characterization of Fluorpopolymers”, ANTEC 2002.

(Continued)

*Primary Examiner*—Ramsey Zacharia
(74) *Attorney, Agent, or Firm*—Larson Newman Abel Polansky & White, LLP; Chi Suk Kim

(57) ABSTRACT

The disclosure is directed to a multilayer film including a first layer and a second layer. The first layer has a fluorinated polymer. The second layer has a melt strain-hardening component and forms no more than about 30% by volume of the multilayer film.

21 Claims, 3 Drawing Sheets

300

302

304

306

308

310

U.S. PATENT DOCUMENTS

| | | | |
|---|---|---|---|
| 6,436,495 | B1 | 8/2002 | Tsukamoto et al. |
| 6,436,533 | B1 | 8/2002 | Heffner et al. |
| 6,444,311 | B1 | 9/2002 | Friedman et al. |
| 6,482,522 | B1 | 11/2002 | Parsonage et al. |
| 6,524,671 | B1 | 2/2003 | Spohn |
| 6,524,686 | B2 | 2/2003 | Strassel |
| 6,576,342 | B1 | 6/2003 | Cerf et al. |
| 6,583,222 | B1 | 6/2003 | Chaudbary et al. |
| 6,593,005 | B2 | 7/2003 | Tau et al. |
| 6,630,047 | B2 | 10/2003 | Jing et al. |
| 6,635,714 | B1 | 10/2003 | Wood et al. |
| 6,667,101 | B2 | 12/2003 | Silagy et al. |
| 6,685,793 | B2 | 2/2004 | Jing |
| 6,699,798 | B2 | 3/2004 | Rockford |
| 6,706,351 | B2 | 3/2004 | Abusleme et al. |
| 6,743,865 | B2 | 6/2004 | Mckhilef et al. |
| 6,753,087 | B2 | 6/2004 | Jing et al. |
| 6,759,129 | B2 | 7/2004 | Fukushi |
| 6,767,948 | B1 | 7/2004 | Jing |
| 6,780,935 | B2 | 8/2004 | Hedhli et al. |
| 6,790,912 | B2 | 9/2004 | Blong |
| 6,797,781 | B2 | 9/2004 | Lee et al. |
| 6,811,859 | B2 | 11/2004 | Bonnet et al. |
| 6,833,043 | B1 | 12/2004 | Parsonage et al. |
| 6,838,520 | B2 | 1/2005 | Etherton |
| 6,849,314 | B2 | 2/2005 | Jing et al. |
| 6,855,787 | B2 | 2/2005 | Funaki et al. |
| 2001/0051256 | A1 | 12/2001 | Silagy et al. |
| 2002/0061398 | A1 | 5/2002 | Heffner et al. |
| 2002/0068175 | A1 | 6/2002 | Strassel |
| 2002/0074691 | A1 | 6/2002 | Mortellite et al. |
| 2002/0150763 | A1 | 10/2002 | Silagy et al. |
| 2003/0035971 | A1 | 2/2003 | Bussi et al. |
| 2003/0041952 | A1 | 3/2003 | Mortellite et al. |
| 2003/0104219 | A1 | 6/2003 | Hare et al. |
| 2003/0114595 | A1 | 6/2003 | Van Dun et al. |
| 2003/0145938 | A1 | 8/2003 | Mortellite et al. |
| 2003/0198769 | A1 | 10/2003 | Jing et al. |
| 2004/0023037 | A1 | 2/2004 | Baumert et al. |
| 2004/0054050 | A1 | 3/2004 | Pascal et al. |
| 2004/0086721 | A1 | 5/2004 | Bonnet et al. |
| 2004/0137252 | A1 | 7/2004 | Bonnett et al. |

OTHER PUBLICATIONS

M.H. Wagner, "Rheotens-Mastercurves and Drawability of Polymer Melts", Polymer Engineering and Science, mid-Apr. 1996, vol. 36, No. 7., pp. 925-935.

J.S. Lee, et al., "Meltspinning Dynamic of Phan-Thien Tanner Fluids", Korea-Australia Rheology Journal, Jun. 2000, vol. 12, No. 2, pp. 119-124.

T. Matsumoto, et al., "Draw Resonance Involving Rheological Transitions", Polymer Engineering and Science, May 1978, vol. 18, No. 7, pp. 564-571.

J.C. Hyun, "Theory of Draw Resonance", Aiche Journal, May 1978, vol. 24, No. 3, pp. 418-422.

J.C. Hyun, "Part II. Power Law and Maxwell Fluids", AICHE Journal, May 1978, vol. 24, No. 3, pp. 423-426.

S. Goyal, "The Influence of Polymer Structure on Melt Strength Behavior of PE Resins", Plastics Engineering, Feb. 1995, pp. 25-28.

E. M. Phillips, et al., "High Performance Polypropylene Extrusion Coating Resins", Journal of Coated Fabrics, vol. 19, Jan. 1990, pp. 155-168.

K.K. Dohrer, et al., "Resistance to Draw Resonance of Linear Low Density Polyethylene Through Improved Resin Design", ANTEC '89, May 1-3, pp. 177-183, 1989.

P.J. Lucchesi, et al., "Reducing Draw Resonance in LLDPE Film Resins", Plastics Engineering, May 1985, pp. 87-90.

A. Ghijsels, et al., "Draw Resonance Studies on Polypropylene Melts", International Congress on Rheology, 8th, 1980, Ed. by G. Astarita, pp. 15-24.

J. Flanagan, "Better die Design and Equipment Enhance the Cast Film Process", Modern Plastics International, Feb. 1993, pp. 35-37.

E.H. Roberts, et al., "Draw Resonance Reduction in Melt Embossing and Extrusion Coating Resins", Advances in Polymer Technology, vol. 6, No. 1, pp. 65-71 (1986).

H. Kometani, et al., "Development of Wide and High-Speed Nonoriented Film Production Lines", Mitsubishi Heavy Industries, Ltd., Technical Review, vol. 38, No. 1, Feb. 2001.

DRAW RESONANT RESISTANT MULTILAYER FILMS

CROSS-REFERENCE TO RELATED APPLICATION(S)

The present application is a continuation-in-part and claims priority from U.S. Utility patent application Ser. No. 10/783,946, filed Feb. 20, 2004 now abandoned, entitled "DRAW RESONANT RESISTANT MULTILAYER FILMS," naming inventors Kevin G. Hetzler, Viktor Skatchkov, and Xixian Zhou, which application is incorporated by reference herein in its entirety.

TECHNICAL FIELD OF THE DISCLOSURE

This invention, in general, relates to draw resonant resistant multilayer films, methods for manufacturing same, and articles including same.

BACKGROUND

Increasingly, manufacturers are turning to polymers to create surfaces that are resistant to chemical and environmental damage. For example, fluorinated polymers exhibit a resistance to damage caused by exposure to chemicals, such a methyl ethyl ketone (MEK), a resistance to stains, and a resistance to damage caused by exposure to environmental conditions. Such polymers have been used in applications such as airplane and train cargo hold liners, vinyl siding surface treatments, and photovoltaic protective coverings.

However, processing of such films for use in these applications is difficult. Line speed in production is often limited by the appearance of draw resonance at relatively low line speeds, such as below 50 feet per minute. These processing limitations increase costs and reduce the availability of these beneficial films. As such, robust multilayer films having preferred mechanical and processing properties are generally desirable in the art.

SUMMARY

Aspects of the invention are found in a multilayer film including a first layer and a second layer. The first layer has a fluorinated polymer. The second layer has a melt strain-hardening component and forms no more than about 30% by volume of the multilayer film.

Further aspects of the invention are found in a multilayer film having a first layer and a second layer. The first layer includes greater than about 70% by weight of a non-polyolefin melt strain-hardening polymer. The non-polyolefin melt-strain hardening polymer has an increasing tensile force in a draw ratio domain between draw ratios of about 5:1 and about 30:1. The first layer forms no more than about 30% by volume of the multilayer film. The second layer includes a second polymer. The second polymer has a generally flat tensile force in the draw ratio domain.

Further aspects of the invention are found in a method of manufacturing a multilayer film. The method includes extruding a first layer having greater than about 70% by weight of a non-polyolefin melt strain-hardening polymer. The non-polyolefin melt-strain hardening polymer has an increasing tensile force in a draw ratio domain between draw ratios of about 5:1 and about 30:1. The first layer forms no more than about 30% by volume of the multilayer film. The method further includes extruding a second layer including a second polymer. The second polymer has a generally flat tensile force in the draw ratio domain.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

In a particular embodiment, the disclosure is directed to a multilayer film. The multilayer film typically has a layer including a material that is resistant to damage caused by chemical and/or environmental exposure. The multilayer film also has a second layer comprising a melt strain-hardening material. The multilayer film may further include additional layers including materials having desirable mechanical properties.

Figure 1:
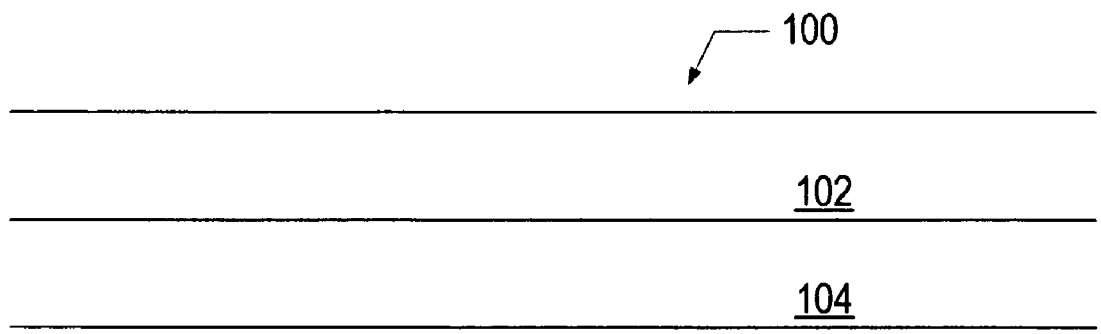
FIGS. 1, 2 and 3 depict exemplary embodiments of multilayer films.

FIG. 1 depicts an exemplary multilayer film. The exemplary film 100 has at least two layers, 102 and 104. Layer 102 comprises a damage resistant polymer that is resistant to damage by chemical and environmental exposure. Layer 104 comprises a melt strain-hardening component that may exhibit higher tensile force than the polymer of first layer in the melt phase. In a particular embodiment, layer 104 forms no more than about 30% by volume of the multilayer film 100. For example, layer 104 may form no more than about 10% by volume of the multilayer film or about 5% by volume of the multilayer film.

Layer 102 comprises a polymer component resistant to chemical and/or environmental exposure. In other exemplary embodiments, the material may have nonstick properties and be resistant to staining. The polymer component may be a fluorinated polymer. For example, the polymer component may be a fluorinated polymer such as a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylenechlorotrifluoroethylene, and mixtures of such fluoropolymers. The fluoropolymer polymers include polyvinylidene fluoride (PVDF) and PVDF copolymers, such as vinylidene fluoride/hexafluoropropylene copolymer. Many fluoropolymers are commercially available from suppliers in various grades. For example suppliers can supply multiple resins having nominally the same composition but different properties, such as different molecular weights to provide specific viscosity characteristics. Exemplary PVDF polymers include PVDF 1010 and PVDF 21510 by Solvay. It is contemplated that the fluoropolymer component of the layer 102 can include a melt blend of multiple fluoropolymers in place of one such polymer. Alloys of PVDF homopolymer and PVDF copolymer may provide the film with improved elastic modulus and gloss reduction. In one exemplary embodiment, the polymer may consist essentially of fluorinated polymer and substantially no melt strain-hardening components.

Layer 104 may comprise a polymer component exhibiting melt strain hardening at processing conditions. Melt strain hardening is exhibited when the melt-phase tensile force smoothed slope relative to a draw ratio domain is significantly positive for a polymeric component. In one exemplary embodiment, the melt strain hardening component is a non-polyolefin polymer that exhibits melt strain hardening at draw ratios greater than 10:1. In another exemplary embodiment, the melt strain hardening component is a non-polyolefin polymer component exhibiting a melt-phase tensile force smoothed slope in the melt phase of greater than about 0.03 cN between the draw ratios of between 0 and greater than 30:1. For example, the melt-phase tensile force to draw ratio slope may be greater than about 0.04 cN in the draw ratio domain between about 10:1 to about 20:1 or about 10:1 to about 15:1. In another embodiment, the melt strain hardening component may exhibit increasing smoothed melt-phase tensile force in the draw ratio domain between about 5:1 and about 30:1, such as between about 10:1 and about 15:1 or between about 20:1 and about 30:1. In a further exemplary embodiment, the melt strain hardening polymer exhibits melt strain hardening in which the polymer exhibits a positive ratio of change in melt-phase tensile force to change in draw ratio in the draw ratio domain of between a first draw ratio and a second draw ratio, wherein the damage resistant polymer may exhibit a melt plateau in the same domain. According to a particular embodiment, the melt strain hardening polymer exhibits a melt-phase tensile force to draw ratio slope of greater than about 0.03 cN in the desired draw ratio domain. For example, the melt strain-hardening polymer may exhibit a slope of not less than about 0.03 cN over a specific draw ratio domain, such as not less than about 0.4 cN or not less than about 0.5 cN over a specific draw ratio domain. In contrast, a mechanical property or surface property polymer may exhibit a small slope or generally flat slope of less than about 0.03 cN, such as less than about 0.005 cN or substantially zero cN over the specific draw ratio domain. In a further exemplary embodiment, the melt strain hardening polymer exhibits a positive ratio change in melt-phase tensile force to change in draw ratio in the draw ratio domain of about 10:1 and about 15:1 during processing at about 230° C. The damage resistant polymer exhibits a generally flat slope in the same draw ratio domain under the same processing conditions. In a further exemplary embodiment, the melt strain hardening component may exhibit a greater melt-phase tensile force to draw ratio slope than the mechanical or surface components over a draw ratio domain, such as at least about 30%, at least about 50%, at least about 80%, at least about 100%, or at least about 300% greater slope.

The melt strain hardening polymer may, for example, be a non-polyolefin polymer such as an acrylic and not a polyethylene or polypropylene. In another exemplary embodiment, the melt strain hardening polymer may be a high average molecular weight fluoropolymer. In one exemplary embodiment, the non-polyolefin polymer may be a branched polymer. In another exemplary embodiment, the non-polyolefin polymer may be a linear polymer. Acrylic polymer may be an alkyl group having from 1-4 carbon atoms, a glycidyl group or a hydroxyalkyl group having from 1-4 carbon atoms. Representative acrylic polymers include polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate and mixtures thereof.

The acrylic polymer may, for example, be an impact grade or impact modified acrylic. Impact-modified acrylic polymers generally comprise a copolymer of monomers of acrylic monomers with an effective amount of suitable comonomer or graft moiety to produce the desired elastic modulus and impact resistance. An acrylic elastomer, sometimes referred to as acrylate rubber, polyacrylate rubber, polyacrylic elastomer or "ACM" and which is a composition based on a mixture of a polyacrylate and polymethacrylate, a polyacrylate and ethylene methacrylate copolymer ("EMAC"), [such as Chevron Chemicals EMAC 2260] or a polyacrylate and ethylene butylacrylate ("EBAC") can be used. Alternatively a thermoplastic impact-modified acrylic polymer can be a blend of a clear glassy acrylic polymer, such as a plastic copolymer of ethylene and a carboxylic acid compound selected from acrylic acid, methacrylic acid and mixtures thereof, with elastomeric components, for example.

The impact-modified acrylic polymer generally includes fine particles of the elastomer dispersed uniformly in the plastic copolymer. The impact grade acrylic may comprise transparent toughened thermoplastic blends prepared by blending 10 to 99 weight percent of a block copolymer; 0.1 to 1 weight percent of particulate rubber having a particle size from 0.1 to 10 microns; and the balance a clear glassy polymer. Another suitable technique for making impact-modified acrylic polymer employs the use of a so-called "core/shell" product, such as Atofina DR-101 resin. These generally are polymer particles that have a central core of one polymer surrounded by a shell of another polymer. The core can be either the plastic or elastomer component and the shell will be the opposite, i.e., elastomer or plastic component. The core/shell particles are fed to a melt mixing apparatus, such as a melt extruder in which the core and shell domains are blended in the melt phase to form a homogeneous blend on a much smaller scale and a film is formed from the extrudate of this homogeneous blend.

In one particular embodiment, the melt strain hardening material may be a linear impact modified acrylic. In a further exemplary embodiment, the melt strain hardening acrylic may be a branched impact modified acrylic. Generally, linear acrylic polymers that are not impact modified, such as those typically used in adhesive layers, are not suitable. However, an acrylic exemplifying melt strain hardening behavior in the desired draw ratio domain is suitable.

In one exemplary embodiment, the layer 104 comprises a blend of melt strain-hardening polymer and other components. For example, the layer 104 may comprise greater than about 70% of the melt strain-hardening component, such as, impact grade acrylic. In an exemplary embodiment, the layer may comprise greater than about 75% impact grade acrylic or greater than about 80% impact grade acrylic. Layer 104 may also include other components such as the damage resistant polymer. For example, the layer 104 may include no more than about 25% PVDF, PVDF copolymer or blend thereof by weight. In other exemplary embodiments layer 104 may include no more than about 20% PVDF by weight or no more than about 10% PVDF by weight. In one embodiment, layer 104 consists essentially of the melt-strain hardening component.

In addition, layers 102 and 104 may include inorganic fillers, organic fillers, antioxidants, UV additives, flame retardants, antidegradation additives, and adjuvants, among others. For example, layer 102 may include minor but significant fractions of antidegradation additives and adjuvants. The inorganic filler may, for example, include titanium dioxide, zinc oxide, iron oxide, calcium carbonate, carbon black, color pigments and clays.

Figure 2:
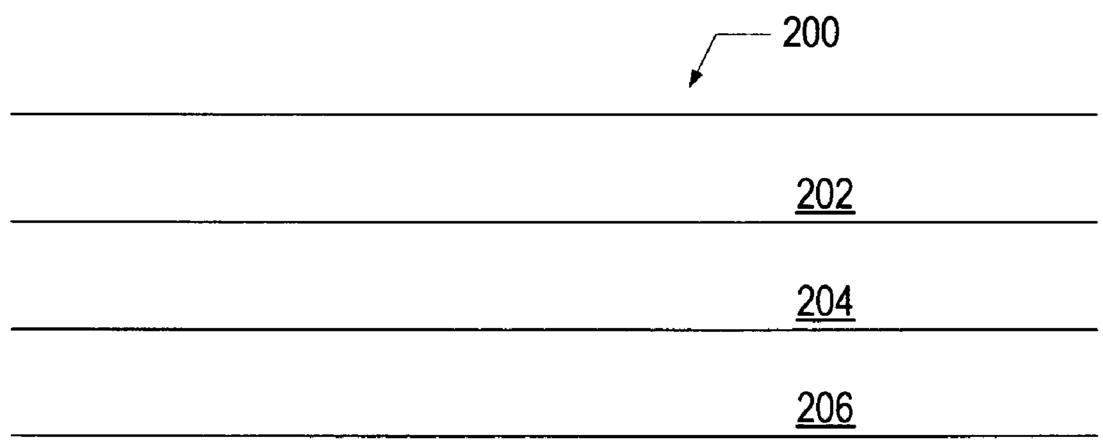

FIG. 2 depicts another exemplary embodiment of a multilayer film. The multilayer film 200 includes layers 202, 204, and 206. Layer 202 may, for example, include a damage resistant polymer. In an alternate embodiment, layer 202 may be an adhesive layer. Layer 204 may include a melt strain-hardening component. Layer 206 may include a polymer component exhibiting a desirable mechanical property.

In one exemplary embodiment, layer 202 comprises no more than about 20% by volume of the multilayer film. For example, layer 202 may comprise no more than about 10% by volume or no more than about 5% by volume of the multilayer film. Layer 204 may comprises no more than about 20% by volume of the multilayer film. For example, layer 204 may comprise no more than about 10% of the multilayer film or no more than about 5% of the multilayer film. Layer 206 may comprise greater than about 40% by volume of the multilayer film. For example, layer 206 may comprise greater than about 60% by volume or greater than about 80% by volume of the multilayer film.

Layer 202 may comprise a damage resistant polymer, such as a fluorinated polymer such as PVDF. Layer 202 may comprise blends of damage resistant polymers, other polymers, and inorganic fillers. In an alternate embodiment, layer 202 may comprise an adhesive component, other polymers, and inorganic fillers. Layer 204 may comprise a melt strain-hardening component and may be a blend including other polymers such as the damage resistant component.

Layer 206 may comprise a component with desirable mechanical properties, which are manifested in the resulting multilayer film. Such mechanical properties include elongation, flexibility and drape. These properties may, for example, be similar to the properties of fluoropolymer film. In one exemplary embodiment, layer 206 comprises the damage resistant component in a blend of other components. Layer 206 may comprise a fluorinated polymer. In particular embodiment, layer 206 comprises greater than about 20% by weight of a fluorinated polymer, such as those fluorinated polymers listed above, such as PVDF. Layer 206 may also include the melt strain-hardening component such as impact grade acrylic, inorganic fillers, organic fillers, antioxidants, UV additives, flame retardants, antidegradation additives, and adjuvants, among others. For example, layer 206 may include minor but significant fractions of antidegradation additives and adjuvants. The inorganic filler may, for example, be titanium dioxide, zinc oxide, iron oxide, calcium carbonate, carbon black, color pigments and clays. In one exemplary embodiment, layer 206 comprises greater than about 30% by weight PVDF, no more than about 35% impact grade acrylic, an inorganic filler, and antidegradation additive.

Layers should have adequate compatibility with the adjacent layers and the substrate compositions to adhere well to both. In alternate embodiments, layers 206 and 204 may be reversed in order. In another alternate embodiment, layer 202 may be absent or substitute with a layer identical to layer 206.

Figure 3:
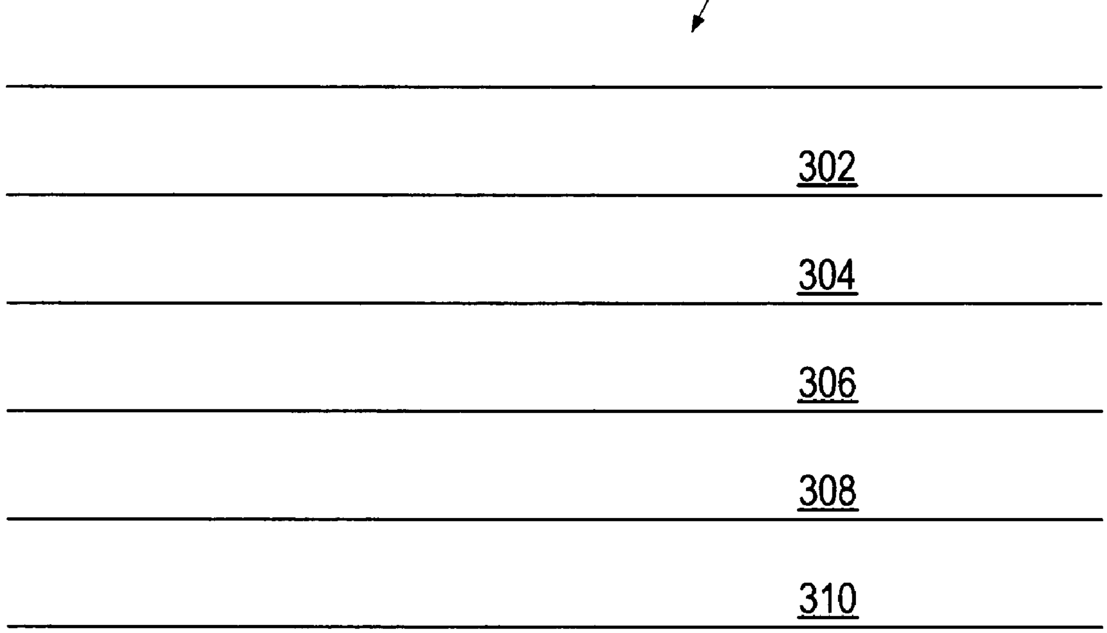

FIG. 3 depicts an exemplary embodiment of a multilayer film 300. The multilayer film includes five layers, 302, 304, 306, 308, and 310. Layers 302 and 310 may, for example, comprise damage resistant polymer components, such as fluorinated polymers, such as PVDF, or an adhesive polymer, such as an acrylic. Layers 304 and 308 may, for example, comprise a melt strain-hardening component, such as impact grade acrylic polymers. Layer 306 may, for example, comprise a polymer with desirable mechanical properties and may, for example, be a blend of the fluorinated polymer and the impact grade acrylic. In an alternate embodiment, layers 304 and 308 may comprise a polymer with desirable mechanical properties and layer 306 may comprise a melt strain-hardening component.

In one embodiment, layers 302 and 310 formed of a damage resistant polymer component, together comprise no more than about 20% by volume of the multilayer film. For example, each layer 302 and 310 may comprise no more than about 10% by volume, or no more than about 5% by volume of the multilayer film. Layers 304 and 308 formed of the melt strain-hardening component, together may comprise no more than about 40% by volume of the multilayer film. For example, layers 304 and 308 may form no more than about 10% by volume each, or no more than 5% by volume each of the multilayer film. Layer 306, formed of a component having desirable mechanical properties, may comprise greater than about 40% by volume of the multilayer film. For example, layer 306 may form greater than about 60% of the multilayer film, or even greater than about 80% of the multilayer film. In an alternate example, in which layer 306 is split into multiple layers, the combined layers provide greater than about 40% by volume of the multilayer film.

In one exemplary embodiment, the film structure may be A/C/B/C/A where each letter represents a different material extruded from a unique extruder. Layer A may, for example, be a 100% Solvay PVDF 1010 and each layer A may form about 10% by volume of the multilayer film. Layer B may be a PVDF/acrylic blend comprising greater than about 60% by weight PVDF homopolymer and/or copolymer and not more than about 40% acrylic by weight. Layer B may form greater than about 40% by volume of the multilayer film. Layers C may be formed of Atofina impact grade acrylic DR101 and each of the C layers may make up less than about 10% by volume of the multilayer film, such as about 5% by volume.

In another exemplary embodiment, the film structure may be A/C/B/C/D where each letter represents a different material extruded from a unique extruder. Layer A may, for example, be a 100% Solvay PVDF 1010 and may form about 10% by volume of the multilayer film. Layer B may be a PVDF/acrylic blend comprising greater than about 60% by weight PVDF and not more than about 40% acrylic by weight. Layer B may form greater than about 40% by volume of the multilayer film. Layers C may be formed of Atofina impact grade acrylic DR101, each of the C layers making up less than about 10%, such as about 5% by volume of the multilayer film. Layer D may form approximately 30% by volume of the multilayer film. Layer D may comprise similar materials to Layer B. However, Layer D may be enhanced for custom properties, such as having a lower melting temperature (e.g. more acrylic) for heat sealing. Layer B may also be used exclusively for the addition of recycle and trim.

In another exemplary embodiment, the film structure may be A/C/B/C/B. Layer A may be a 100% Solvay PVDF 1010 and may comprise about 10% by volume of the multilayer film. Layers B may comprise a PVDF/acrylic blend comprising greater than about 60% PVDF and no more than about 40% acrylic by weight. The B layers may, in combination, comprise about 70% by volume of the multilayer film. In one exemplary embodiment, the outside B layer may comprise between about 20 to 35% of the total film volume. The C layers may be an Atofina impact grade acrylic DR101. Each of the C layers may comprise about 5% by volume of the total film volume.

In a further exemplary embodiment, the film structure may be A/B/C wherein layer A is 100% Solvay PVDF 1010, comprising about 5-10% by volume of the film. Layer B is a PVDF and acrylic blend comprising about 30-80 wt % PVDF, such as about 60 wt % PVDF, and about 40 wt % acrylic. Layer B comprises about 80-90% by volume of the film. Layer C is a PVDF and acrylic blend comprising about 55-100 wt % acrylic, such as about 60-70 wt % acrylic and about 30-40 wt % PVDF. Layer C comprises about 5-10% by volume of the film. In one example, Layer C may include greater than 70 wt % melt strain hardening acrylic. In another example, an additional Layer D may be added comprising greater than 70 wt % melt strain hardening acrylic.

Another exemplary structure may be C/B/C in which layer C is a PVDF and acrylic blend comprising about 55-100 wt % acrylic, such as about 60-90% acrylic and about 10-40 wt % PVDF. Layer B is a PVDF and acrylic blend comprising about 30-80 wt % PVDF, such as about 60 wt % PVDF and about 40 wt % acrylic. Layer C comprises about 5-10% by volume and layer B comprises about 80-90% by volume of the film. In one exemplary embodiment, at least one of the Layers C may include greater than 70 wt % melt strain hardening acrylic. In another example, an additional Layer D may be added comprising greater than 70 wt % melt strain hardening acrylic.

A further exemplary embodiment includes at least 3 layers extruded via 3 extruders. A first layer includes a fluoropolymer. A second layer includes a melt strain hardening component and a third layer is an adhesive layer comprising greater than about 55 wt % acrylic, such as greater than about 70 wt % acrylic.

Another exemplary embodiment includes at least 4 layers, such as 5 layers. Layer 1 includes a fluoropolymer. Layer 2 includes a melt strain hardening component. Layer 3 includes between about 20 wt % and 80 wt % acrylic and between about 20 wt % and 80 wt % fluoropolymer. An optional layer 4 includes the melt strain hardening component. Layer 5 is an adhesive layer. The 5-layer structure may be formed using 4 extruders.

An alternate exemplary embodiment includes at least 4 layers, such as 5 layers. Layer 1 is an adhesive layer. Layer 2 includes a melt strain hardening component. Layer 3 includes between about 20 wt % and 80 wt % acrylic and between about 20 wt % and 80 wt % fluoropolymer. An optional layer 4 includes the melt strain hardening component. Layer 5 is an adhesive layer. The 5-layer structure may be formed using 4 extruders.

Such multilayer films may be manufactured by co-extruding the foregoing embodiments.

Figure 4:
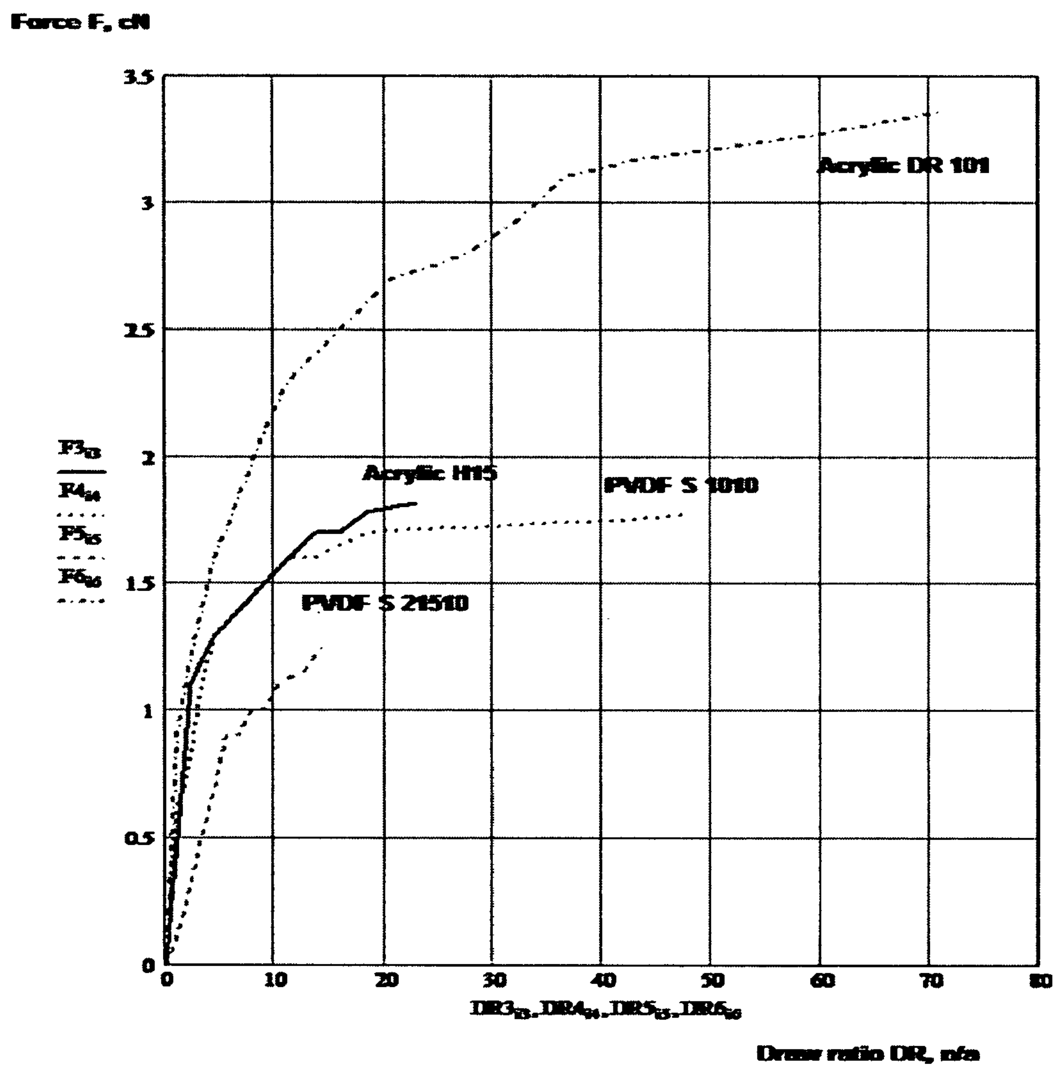
FIG. 4 depicts extensional velocity data for exemplary film components.

FIG. 4 characterizes the behavior of several materials, including damage resistant polymers PVDF 1010 and PVDF 21510, and melt strain-hardening acrylic polymers, such as Atofina DR101. The tests were performed with a Goettfert Rheo-Tens device. The melt chamber has a diameter of 12 mm. The tests were performed with a piston speed of 0.060764 mm/s, a chamber pressure of 187 bars, and a temperature of 230 C. The capillary entrance angle was 70 degrees. The capillary had a diameter of 1 mm and a length to diameter ratio of 20. The take-off strand length was 115 mm. The wheels were standard with a 0.1 mm gap. The acceleration of draw down velocity was 3 mm/s$^2$.

The exemplary damage resistant components and acrylic Cyro H-15 depict a melt plateau in which the slope of change in tensile force versus the change in draw ratio is small to zero, generally less than about 0.03 cN in the draw ratio domain of 10:1 to 20:1. In contrast, the melt strain-hardening components, such as Atofina DR101, exhibit a positive slope in the same regions at which the melt plateau occurs for the PVDF examples. In particular, the melt strain-hardening polymers exhibit a slope of greater than about 0.03 cN for draw ratios between 10:1 and 20:1. In one exemplary component, the slope is greater than 0.04 cN, and may be greater than about 0.1 cN between draw ratios of 10:1 and 20:1.

According to embodiments of the present invention, various multi-layer films are provided that have desirable film properties, and which may be made economically. In particular, extruded multi-layer films are generally provided that can be drawn at a line speed greater than about 50 ft/min with substantially no draw resonance. Indeed, embodiments may be formed at substantially higher line speeds, such as greater than about 75 ft/min or even greater than 100 ft/min. In one example, a 10% tie layer comprising 100% melt strain hardening acrylic was shown to effectively reduce draw resonance at line speeds of about 100 ft/min. As utilized herein, the descriptive phrase “substantially no draw resonance,” generally means no periodical gauge variations in the web direction of 30% or more. Fabrication at such high lines speeds is typically desirable, as maximum line speed, the line speed at which unacceptable draw resonance occurs or other undesirable processing conditions occur, generally dictates production throughput. In line with the foregoing, according to embodiments of the present invention, the multi-layer films may be successfully formed at relatively high draw ratios, such as greater than about 10:1, or even greater than about 15:1. In addition to desirable processing characteristics, the multilayer films demonstrate desirable mechanical and/or chemical properties. For example, the multilayer film may exhibit desirable flexibility, elongation, and drape.

While various examples and embodiments have been described above, it is understood in the art that modifications thereto may be made by one of ordinary skill in that art without departing from the scope of the present claims.

What is claimed is:

1. A multi-layer film comprising:

a first layer comprising a fluorinated polymer; and a second layer underlying and directly contacting the first layer, the second layer comprising a polymeric melt strain-hardening component and comprising no more than about 30% by volume of the multi-layer film;

a third layer underlying and directly contacting the second layer, the third layer comprising the fluorinated polymer and comprising greater than about 40% by volume of the multi-layer film;

a fourth layer comprising the polymeric melt strain-hardening component and comprising no more than about 20% by volume of the multi-layer film; and a fifth layer comprising the fluorinated polymer.

2. The multi-layer film of claim 1, wherein the second layer consists essentially of the polymeric melt strain-hardening component.

3. The multi-layer film of claim 1, wherein the third layer comprises greater than about 20% by weight of the fluorinated polymer.

4. The multi-layer film of claim 3, wherein the third layer comprises less than about 80% by weight of the polymeric melt strain-hardening component.

5. The multi-layer film of claim 1, wherein the third layer comprises the polymeric melt strain-hardening component and greater than about 30% by weight of the fluorinated polymer.

6. The multi-layer film of claim 1, wherein the second layer and the fourth layer in combination comprise no more than about 40% by volume of the multi-layer film.

7. The multi-layer film of claim 1, wherein the second layer comprises no more than about 10% by volume of the multi-layer film.

8. The multi-layer film of claim 1, wherein the second layer comprises about 5% by volume of the multi-layer film.

9. The multi-layer film of claim 1, wherein the fluorinated polymer comprises PVDF.

10. The multi-layer film of claim 1, wherein the polymeric melt strain-hardening component comprises a non-polyolefin polymer.

11. The multi-layer film of claim 10, wherein the non-polyolefin polymer comprises a linear chain non-polyolefin polymer.

12. The multi-layer film of claim 11, wherein the linear chain non-polyolefin polymer is an impact grade acrylic.

13. The multi-layer film of claim 1, wherein the polymeric melt strain-hardening component comprises an impact grade acrylic.

14. The multi-layer film of claim 1, wherein the polymeric melt strain-hardening component exhibits increasing tensile force between the draw ratios of about 5:1 and about 30:1.

15. The multi-layer film of claim 14, wherein the polymeric melt strain-hardening component exhibits increasing tensile force between the draw ratios of about 10:1 and about 15:1.

16. The multi-layer film of claim 1, wherein the polymeric melt strain-hardening component exhibits a positive smoothed slope of change in tensile force to change in draw ratio in the draw ratio domain between a first draw ratio and a second draw ratio.

17. The multi-layer film of claim 16, wherein the first draw ratio is 10:1 and the second draw ratio is 15:1.

18. The multi-layer film of claim 16, wherein the first draw ratio is 20:1 and the second draw ratio is 30:1.

19. The multi-layer film of claim 16, wherein the positive smoothed slope is not less than 0.03 cN.

20. The multi-layer film of claim 1, wherein the second layer comprises greater than about 70% by weight of the polymeric melt strain-hardening component.

21. The multi-layer film of claim 1, wherein the polymeric melt-strain hardening component includes impact grade acrylic, and wherein the second layer comprises the fluorinated polymer and greater than about 70% by weight of the impact grade acrylic.

* * * * *